US012331550B1

(12) United States Patent
McCallum

(10) Patent No.: US 12,331,550 B1
(45) Date of Patent: Jun. 17, 2025

(54) ELECTRONIC LOCK BAR FOR DOORWAYS

(71) Applicant: Natasha McCallum, Conway, SC (US)

(72) Inventor: Natasha McCallum, Conway, SC (US)

( * ) Notice: Subject to any disclaimer, the term of this patent is extended or adjusted under 35 U.S.C. 154(b) by 162 days.

(21) Appl. No.: 17/961,704

(22) Filed: Oct. 7, 2022

(51) Int. Cl.
*E05B 47/00* (2006.01)
*E05C 19/00* (2006.01)

(52) U.S. Cl.
CPC ........ *E05B 47/0012* (2013.01); *E05C 19/001* (2013.01); *E05B 2047/0017* (2013.01)

(58) Field of Classification Search
CPC .. E05B 47/00; E05B 47/0001; E05B 47/0012; E05B 2047/0013; E05B 2047/0014; E05B 2047/0015; E05B 2047/0016; E05B 2047/0017; E05C 19/00; E05C 19/001; E05C 19/002; E05C 19/005
USPC .......................................................... 70/278.1
See application file for complete search history.

(56) References Cited

U.S. PATENT DOCUMENTS

| | | | | |
|---|---|---|---|---|
| 3,964,704 A * | 6/1976 | Karr | B61L 29/02 246/272 |
| 4,349,223 A * | 9/1982 | Spector | E05C 19/003 292/259 R |
| 6,618,993 B2 * | 9/2003 | Burke | E01F 13/06 49/49 |
| 11,002,045 B2 * | 5/2021 | Ramus | E05C 19/184 |
| 2019/0043297 A1 * | 2/2019 | Smith | E05C 3/12 |

* cited by examiner

*Primary Examiner* — Nathan Cumar
(74) *Attorney, Agent, or Firm* — Sanchelima & Associates, P.A.; Jesus Sanchelima; Christian Sanchelima

(57) ABSTRACT

An electronic lock bar for doorways including a pivoting lockdown assembly, a lockdown support assembly and a keypad assembly. The pivoting lockdown assembly includes an upright stanchion member attached to ground where a motor is coupled on top. In the shaft of the motor a lockdown bar is coupled and rotates going across the door from a vertical position defining a safe mode to a horizontal position defining a lock mode when a password is typed on the inside keypad or outside keypad connected to the motor. The lockdown support assembly includes a holding station member. The holding station member is attached to the ground by means of the distal end thereof. On top of the holding station member a lockdown bar support is attached to maintain the lockdown bar blocked when the lock mode is activated, thereby securing the doorway.

10 Claims, 5 Drawing Sheets

ELECTRONIC LOCK BAR FOR DOORWAYS

BACKGROUND OF THE INVENTION

1. Field of the Invention

The present invention relates to electronic lock bar for doorways and, more particularly, to an electronic lock bar for doorways that secures the doorways and only can be opened with a password introduced in a keypad preventing burglary invasion or any other intrusion.

2. Description of the Related Art

Several designs for electronic locks have been designed in the past. None of them, however, include a pivoting motorized lockdown that goes across the doorway which can be selectively actuated to be opened or closed.

Applicant believes that a related reference corresponds to U.S. Pat. No. 11,002,045 issued for door bar security system. Applicant believes that another related reference corresponds to U.S. Pat. No. 4,349,223 issued for burglar proof bolt. None of these references, however, teach of an electronic lock bar for doorways that is comprised of an upright stanchion member which supports a pivoting motorized lockdown bar between a locked horizontal position and an unlocked vertical position.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a lock device to secure the doorways preventing any intrusion.

It is another object of this invention to provide a security device to help people feel safe.

It is still another object of the present invention to provide a device that secures the doorway protecting valuables and personal belongings.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
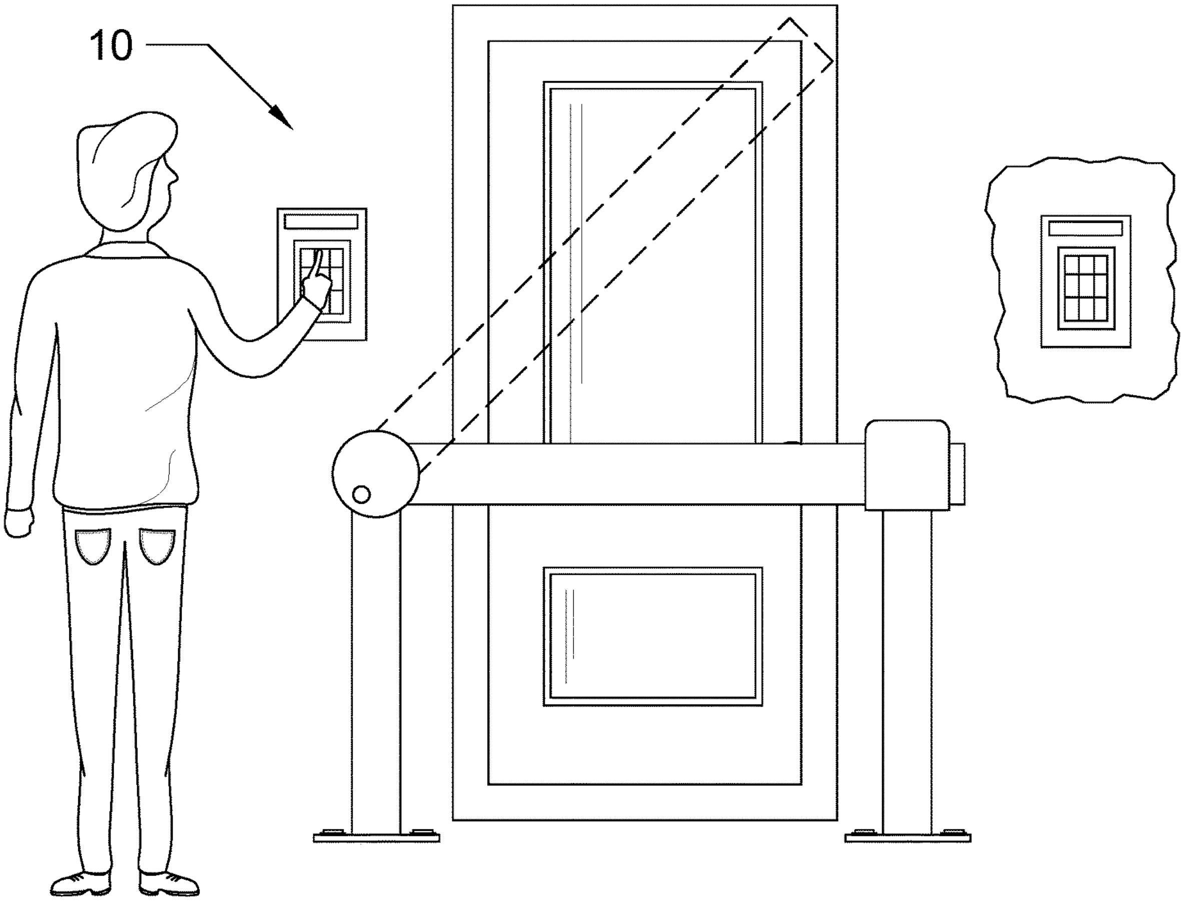
FIG. 1 represents an operational view of an exemplary embodiment of the present invention 10 shown in use.

Referring now to the drawings, where the present invention is generally referred to with numeral 10, it can be observed that it basically includes a pivoting lock down assembly 20, a lockdown support assembly 40, a keypad assembly 60, and various exemplary embodiments (100) thereof. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Best illustrated in FIG. 1 in one embodiment of the present invention 10, the pivoting lockdown assembly 20 includes an upright stanchion member 24, said upright stanchion member 24 may be presented in various sizes or geometries to be attached to a ground. In a suitable embodiment, at the bottom distal end of the upright stanchion member 24 may be formed a suitable geometry that is capable of being attached to the ground by means of a plurality of fasteners. In an exemplary embodiment, a central portion of the upright stanchion member 24 may have a cylindrical shape, a circular shape, a square shape, a regular shape, an irregular shaper of any other variation thereof, with a minor perimeter that conforms with the shape of the distal end that is to be formed. The upright stanchion member 24 may be made of any suitable material from the art, be it wood, steel, aluminum, polymers, engineering materials, or any other variation thereof. In a suitable embodiment, at the top portion of the upright stanchion member 24 a motor 26 is operatively coupled. In an exemplary embodiment the motor 26 may be a universal motor, a stepper motor, a servo motor, an AC motor or any other suitable electric motor known in the art. The pivoting lockdown assembly 20 further includes a lockdown bar 22 attached to the motor 26 by means of a shaft included in the motor 26. The motor 26 may be embedded in a housing, wherein the housing may have an aperture in a portion of the periphery of the housing where the lockdown bar 22 is capable of fit and an area of the aperture permits the lockdown bar 22 to rotate. In other embodiments, the lockdown bar 22 may have a cylindrical shape, a rectangular shape, a square shape, a regular shape, an irregular shape or any other suitable variation thereof. The lockdown bar 22 may be made of any suitable material from the art, be it wood, steel, aluminum, polymers, engineering materials, or any other variation thereof. In a suitable embodiment the lockdown bar 22 may have a suitable length to cross along the width of a doorway 100 known in the prior art. In an exemplary embodiment, the pivoting lockdown assembly 20 is placed on an external periphery of a doorway frame and close to a wall wherein the doorway 100 is mounted from inside a property as FIG. 1 illustrates.

Figure 2A:
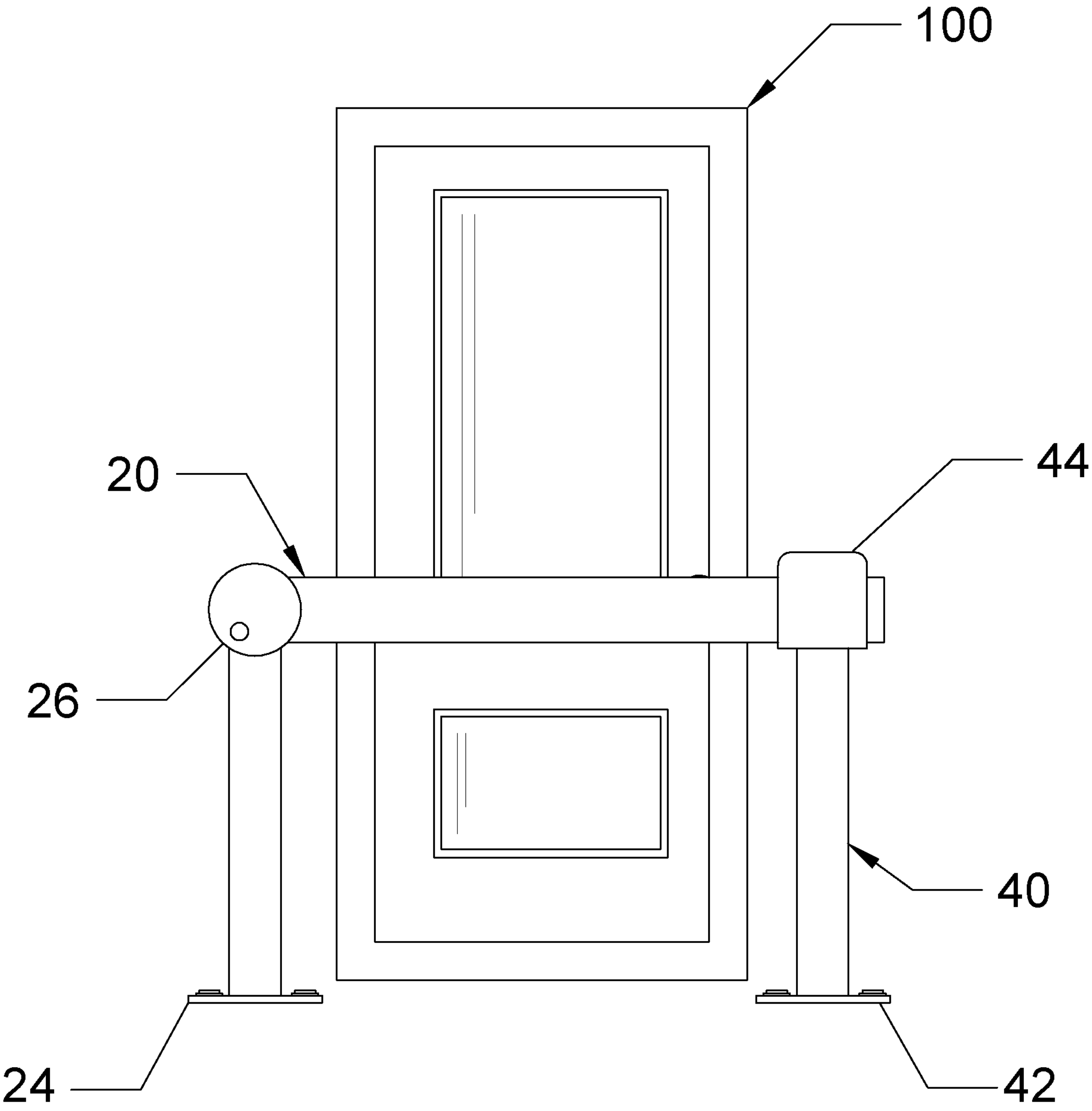
FIG. 2A shows a front view of an exemplary embodiment of the pivoting lockdown assembly 20 in lock mode of the lockdown bar 22 from the upright stanchion member 24.

Electronic lock bar for doorways 10 further includes a holding stanchion member 42. In a suitable embodiment, holding stanchion member 42 may be presented in various sizes or geometries to be attached to a ground. In a suitable embodiment, at the distal end of the holding stanchion member 42 may be formed in a suitable geometry that is capable of being attached to the ground by means of a plurality of fasteners. In an exemplary embodiment a central portion of the holding stanchion member 42 may have a cylindrical shape, a circular shape, a square shape, a regular shape, an irregular shaper of any other variation thereof, with a minor perimeter that conforms with the shape of the bottom distal end thereof. In a suitable embodiment, at the top portion of the holding stanchion member 42 a lockdown bar support 44 is coupled. The lockdown support assembly 40 may be made of, a wood material, a steel material, an aluminum material, a polymers material, an engineering material or any other suitable material known in the art. In an exemplary embodiment the lockdown bar support 44 may have a shape that conforms the shape of the lockdown bar 22 with an opening portion wherein the lockdown bar 22 sits to be supported as best depicted in FIG. 2A. In an exemplary embodiment, the lockdown support assembly 40 is placed in an external periphery of a doorway frame opposite from the pivoting lockdown assembly 20 is attached and close to a wall wherein the doorway 100 is mounted from inside a residence as best illustrated in FIG. 1.

In the present exemplary embodiment, the electronic lock bar for doorways 10 further includes a keypad assembly 60 having an inside keypad 62 and an outside keypad 64. In an exemplary embodiment the inside keypad 62 may have a plurality of typing keys, a plurality of numeric keys, a touch pad or any other suitable variation thereof. In a suitable exemplary embodiment, the inside keypad 62 may have a circular shape, a square shape, an oval shape, a regular shape, irregular shape or any other suitable variation thereof. In an exemplary embodiment, the inside keypad 62 is preferred for being installed on a surface of the wall wherein the doorway 100 is mounted as shown in FIG. 1. In another suitable embodiment the outside keypad 64 may have a plurality of typing keys, a plurality of numeric keys, touch pad or any other suitable variation thereof. In a suitable exemplary embodiment, the outside keypad 64 may have a circular shape, a square shape, an oval shape, a regular shape, irregular shape or any other suitable variation thereof. In an exemplary embodiment, the inside keypad 64 is preferred for being installed on an external surface of the wall wherein the doorway 100 is mounted as shown in FIG. 1.

Figure 2B:
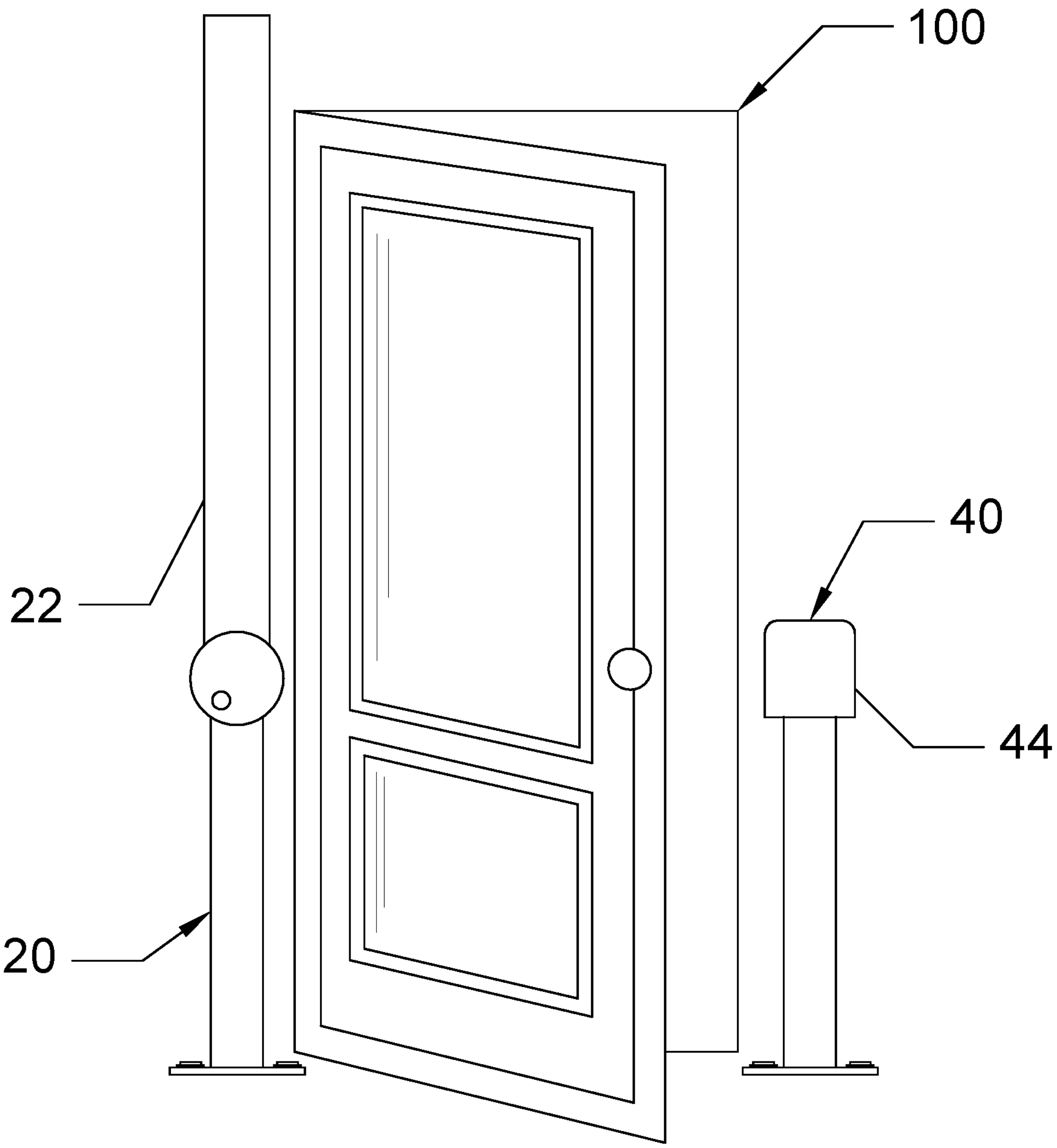
FIG. 2B illustrates a detailed perspective view of an exemplary embodiment of the pivoting lockdown assembly 20 in safe mode of the lockdown bar 22 from the upright stanchion member 24.
Figure 3:
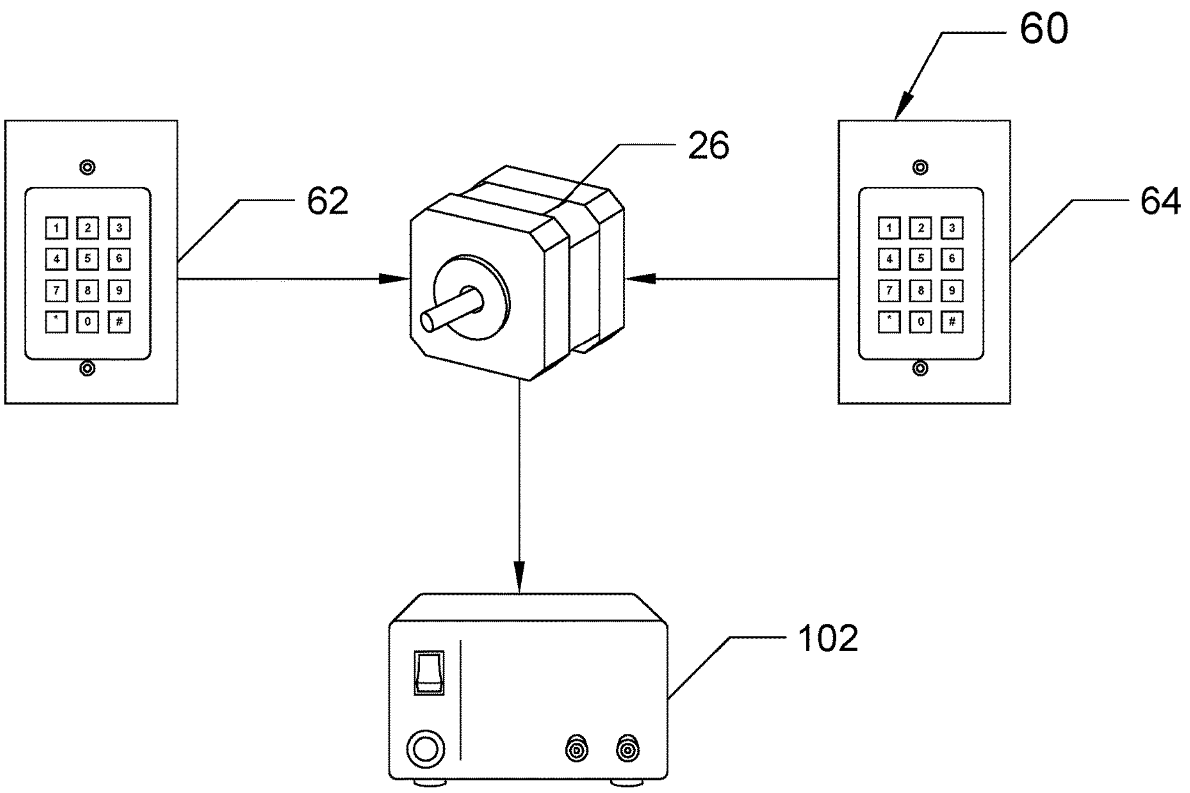
FIG. 3 is a representation of the connection between the keypad assembly 60 and the motor 26 connected to a power supply 102.
Figure 4:
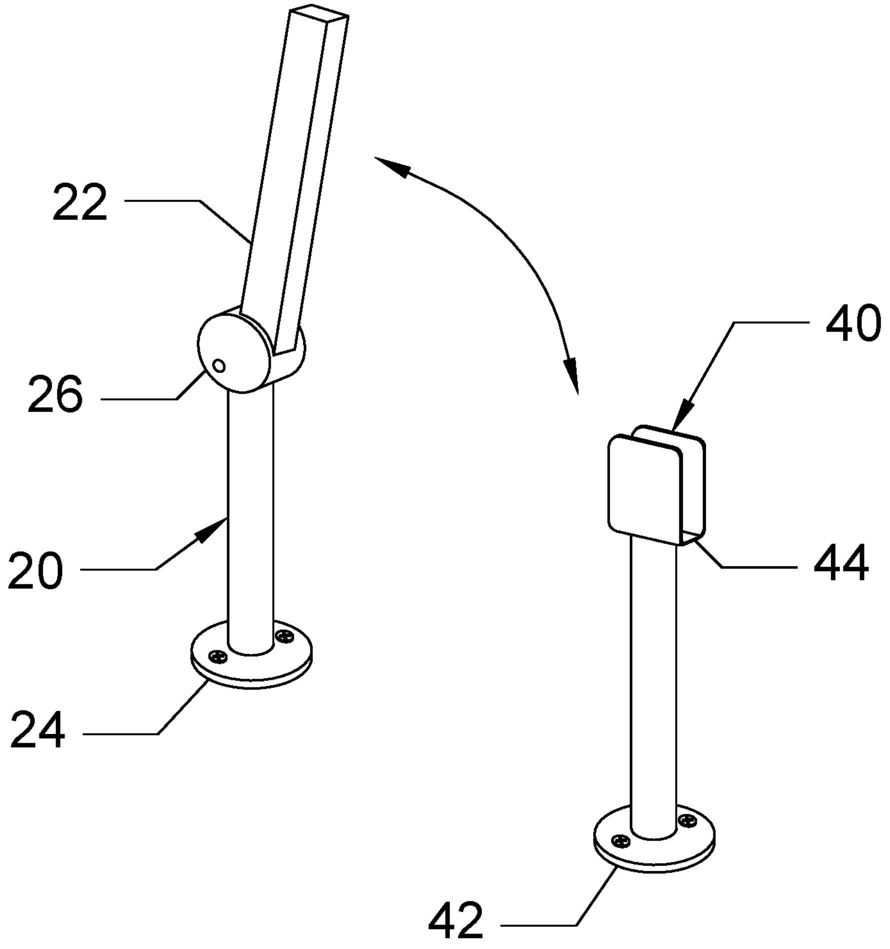
FIG. 4 illustrates an isometric view of an exemplary embodiment of the present invention 10, wherein the lockdown bar 22 has a rotational movement allowing the lockdown bar 22 to move from a horizontal position to a vertical position and vice versa.

Referring now to FIG. 3 which shows the association between the keypad assembly 60 with respect to the motor 26 and powered by means of a power supply 102 or any other suitable source of power known in prior art. In an exemplary embodiment the association between the keypad assembly 60 with respect to the motor 26 may be by means of wires, a broadcasted signal or any other suitable connection known in the art. In an exemplary embodiment of the present invention, best depicted in FIG. 2A, represents a lock mode, wherein the lockdown bar 22 is configured in a horizontal position abutting a portion of the lockdown bar 22 against a receiver wall of the lockdown bar support 44 preventing the doorway 100 to be opened. The lockdown bar 22 is selectively actuated in a lock mode when a user actuates the motor 26 by means of the inside keypad 62, wherein a password, a key, a fingerprint on any other suitable security configuration is introduced to the inside keypad 62. As illustrated in FIG. 2B, the lockdown bar 22 rotates from a horizontal position to a vertical position by means of the shaft coupled to the lockdown bar 22. The lockdown bar 22 in a safe mode configuration allows the door 100 to be opened. Best illustrated in FIG. 4, the lockdown bar 22 may be selectively actuated from a lock mode to a safe mode and vice versa from inside the property or outside thereof by means of the keypad assembly 60, wherein a display, an emitting light, an audible alert or any other suitable variation thereof to acknowledge when the lockdown bar 22 is actuated in the safe mode or lock mode.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electronic lock bar for doorways, comprising:

a pivoting lock down assembly including an upright stanchion member, wherein said upright stanchion member has a central portion with a cylindrical shape, wherein said upright stanchion member is attached to a ground, said pivoting lockdown assembly includes a motor coupled to said upright stanchion member and to a lockdown bar, said motor transmits a rotation to said lockdown bar, wherein said lockdown bar has a length larger than a width of the doorway;

a lockdown support assembly having a holding stanchion member, wherein said holding stanchion member has a cylindrical shape, wherein said holding stanchion member is attached to the ground, said holding stanchion member includes a lockdown bar support on top thereof, said lockdown bar sits on said lockdown bar support when said motor rotates securing the doorway; and a keypad assembly, said keypad assembly operatively connected to said motor for activation thereof to transmit the rotation to said lockdown bar.

2. The electronic lock bar for doorways of claim 1, wherein said upright stanchion member is attachable to the ground by means of a plurality of fasteners.

3. The electronic lock bar for doorways of claim 1, wherein said motor coupled on top of said upright stanchion member has a shaft included in a side of said motor oriented perpendicularly with respect to said upright stanchion member.

4. The electronic lock bar for doorways of claim 1, wherein said upright stanchion member is placed inside a property and on an external periphery of a doorway frame in front of a wall wherein said doorway is mounted.

5. The electronic lock bar for doorways of claim 1, wherein said holding stanchion member is attachable to the ground by means of a plurality of fasteners.

6. The electronic lock bar for doorways of claim 1, wherein said lockdown bar support has a shape that conforms the periphery of said lockdown bar.

7. The electronic lock bar for doorways of claim 1, wherein said keypad assembly includes at least one inside keypad and one outside keypad.

8. The electronic lock bar for doorways of claim 1, wherein said lockdown bar is configured to rotate in a vertical position perpendicularly with respect to said ground and a horizontal position parallel with respect to said ground.

9. An electronic lock bar for doorways, comprising:

a pivoting lock down assembly including an upright stanchion member, wherein said upright stanchion member has a central portion with a cylindrical shape, wherein said upright stanchion member is attached to a ground by means of a plurality of fasteners, said pivoting lockdown assembly further includes a motor coupled on a top portion of said upright stanchion member, a lockdown bar is attached to said motor, wherein said motor transmits a rotational movement to said lockdown bar;

a lockdown support assembly having a holding stanchion member, wherein said holding stanchion member has a cylindrical shape, wherein said holding stanchion member is attached to the ground by means of a plurality of fasteners, said holding stanchion member includes a lockdown bar support on top thereof, said lockdown bar support has a shape that conforms the periphery of said lockdown bar, wherein said lockdown bar has a length larger than a width of the doorway, wherein said lockdown bar sits on said lockdown bar support when said lockdown bar moves from a vertical position to a horizontal position; and a keypad assembly, said keypad assembly includes at least one inside keypad and one outside keypad operatively connected to said motor, said motor is selectively actuated by means of said keypad assembly, thereby said motor transmits the rotation to said lockdown bar, an input entered by means of said keypad actuates the motor for it to be in locked mode or safety mode.

10. An electronic lock bar for doorways consisting of:

a pivoting lock down assembly including an upright stanchion member, wherein said upright stanchion member has a central portion with a cylindrical shape, wherein said upright stanchion member is attached to a ground by means of a plurality of fasteners, said pivoting lockdown assembly further includes a motor coupled on a top portion of said upright stanchion member, said motor further includes a shaft, wherein a lockdown bar is attached by means of said shaft, said shaft rotates when the motor is actuated transmitting the rotational movement to lockdown bar;

a lockdown support assembly having a holding stanchion member, wherein said holding stanchion member has a cylindrical shape, wherein said holding stanchion member is attached to the ground by means of a plurality of fasteners, said holding stanchion member includes a lockdown bar support on top thereof, wherein said lockdown bar has a length larger than a width of the doorway, said lockdown bar support has a shape that conforms the periphery of said lockdown bar, wherein said lockdown bar sits on said lockdown bar support when said motor is actuated to move from a vertical position to a horizontal position, said motor is embedded in a housing, wherein said housing has a aperture in a portion of the periphery of the housing; and a keypad assembly, said keypad assembly includes at least one inside keypad attached to an internal surface of a wall and one outside keypad attached to an external surface of the wall, wherein said keypad assembly is operatively connected to said motor, said keypad assembly is capable to actuate said motor by typing an input on said keypad assembly, thereby said motor transmits the rotation to said lockdown bar, wherein in said keypad assembly and said motor are operatively powered by means of a source of power supply, said input entered by means of said keypad actuates the motor for it to be in locked mode or safety mode.

* * * * *